United States Patent [19]

Dalton

[11] Patent Number: 5,751,920
[45] Date of Patent: May 12, 1998

[54] SYSTEM AND METHOD FOR ADAPTING THE THRESHOLDS OF A DITHER MATRIX TO THE AMPLITUDE OF AN INPUT SIGNAL

[75] Inventor: John Carl Dalton, San Francisco, Calif.

[73] Assignee: Apple Computer, Inc., Cupertino, Calif.

[21] Appl. No.: 378,956

[22] Filed: Jan. 26, 1995

[51] Int. Cl.$^6$ ..................................................... H04N 1/405
[52] U.S. Cl. ........................... 395/109; 358/443; 358/457; 358/466
[58] Field of Search ...................... 358/443, 455, 358/456, 457, 466, 465, 296, 298, 447; 382/237, 264, 266; 395/106, 109

[56] References Cited

U.S. PATENT DOCUMENTS

| | | | |
|---|---|---|---|
| 4,920,501 | 4/1990 | Sullivan et al. | 358/457 |
| 4,958,218 | 9/1990 | Katayama et al. | 358/456 |
| 4,958,238 | 9/1990 | Katayama et al. | 358/456 |
| 5,111,310 | 5/1992 | Parker et al. | 358/456 |
| 5,317,418 | 5/1994 | Lin | 358/457 |
| 5,444,551 | 8/1995 | Miller et al. | 358/457 |
| 5,471,313 | 11/1995 | Thieret et al. | 358/468 |
| 5,489,991 | 2/1996 | McMurray | 358/455 |
| 5,508,822 | 4/1996 | Ulichney et al. | 358/457 |
| 5,535,020 | 7/1996 | Ulichney et al. | 358/457 |

FOREIGN PATENT DOCUMENTS 0593304  1/1994  European Pat. Off. .

OTHER PUBLICATIONS

Ray, Sullivan and Thomas, Simulated Annealing Applied To Correlated Digital Halftone Patterns, pp. 142–146.

Mitsa, T. and Parker, K., Digital Halftoning Technique Using a Blue–Noise Mask, J. Opt. Soc. Am. A, vol. 9, No. 11, Nov. 1992.

Ulichney, R., The Void-and-Cluster Method for Dither Array Generation, SPEI vol. 19123, Feb. 1993 pp. 332–343.

*Primary Examiner*—Edward L. Coles, Sr.
*Assistant Examiner*—Fan Lee
*Attorney, Agent, or Firm*—Fenwick & West LLP

[57] ABSTRACT

A system for generating a binary representation signal, which is suitable for outputting on an output device, from a continuous toned image signal that is adapted insure local correspondence between the average value of the input signal and the output being representation signal for local spatial areas comprises a processor, an input device, an image adaptor, a summer, a dither signal generator, and a pixel activator. The image adaptor receives a reference image signal, determines the number of pixels in local areas that are to be activated and generates an adaptive signal. The summer sums a dither signal from the dither signal generator and a continuous toned image signal to generate a ditherized signal. The pixel activator receives the adaptive signal and the ditherized signal. The pixel activator generates a signal to activate the pixels in each local area that have the highest sum according to the adaptive signal. A method for generating a binary image signal from a continuous toned image signal comprises the steps of determining the mean intensity of elements in local areas of a reference image, determining the number of pixels in each local area to activate from the mean intensity, half-toning a continuous toned image signal, and generating a signal to activate pixels in each local area according to the elements that the highest half-tone intensity and the number of pixels to activate from the mean intensity.

20 Claims, 12 Drawing Sheets

SYSTEM AND METHOD FOR ADAPTING THE THRESHOLDS OF A DITHER MATRIX TO THE AMPLITUDE OF AN INPUT SIGNAL

BACKGROUND OF THE INVENTION

1. Field of the Invention

The present invention relates generally to systems for half-toning a continuous toned image signal for output on a printer, monitor, or other output device. In particular, the present invention relates to a system and method for adapting the thresholds of a dither matrix to the amplitude of an input signal.

2. Description of the Background Art

When an output device for a computer system, such as a printer or a monitor, has a limited range of outputs, a continuous toned image signal must be transformed into a binary representation signal suitable for using with the output device. The continuous toned image signal represents a continuous toned image. A continuous toned image is made up of elements. Each element has an intensity value and has a corresponding pixel of the final output image. Current techniques for quantization, transforming a continuous toned image signal into a binary representation signal, have several deficiencies.

One deficiency is that the output device introduces visual distortions into the output image. Current quantization systems do not dampen or limit the introduction of these visual distortions into the output image.

A common prior art technique for quantization is referred to as ordered dither. There are 2 basic forms of ordered dither, 2-dimensional and 3-dimensional ordered dither. In 2-dimensional ordered dither, the elements of a continuous toned image signal are compared to a single dither matrix. An element of the continuous toned image signal is a small portion of the image that corresponds to a pixel of the output image. A pixel of the output image is the smallest feature that the output device can resolve. The dither matrix has a plurality of cells; each cell containing a threshold. The dither matrix is significantly smaller than the output image but preferably covers several elements. The dither matrix is replicated, or tiled, across the continuous toned image so that each element has a corresponding cell of the dither matrix. The intensity of an element is compared to the threshold held in the corresponding cell. If the intensity of the element is greater than the threshold, then the corresponding pixel is activated in the output image. If the intensity is less than the threshold, then the pixel is not activated in the output image.

Another description of 2-dimensional half-toning is shown in FIG. 1. FIG. 1 shows a system 10 for generating a binary representation signal of a continuous toned image signal. The system 10 comprises a summer 12 and a threshold analyzer 14. An output of the summer 12 is coupled to an input of the threshold analyzer 14, and an output of the threshold analyzer 14 forms an output of the system 10. The summer 12 sums the continuous toned image signal with a dither signal. The two signals are summed on a cell/element basis. A value held in each cell is added to the intensity of the corresponding element. The threshold analyzer 14 receives the output of the summer 12. For all elements having a combined intensity and dither signal greater than a uniform threshold, the threshold analyzer 14 generates a signal for the corresponding pixels to be activated. For all elements having a combined intensity and dither signal less than the uniform threshold, the threshold analyzer 14 generates a signal for the corresponding pixels not to be activated. The two methods for 2-dimensional ordered dither are equivalent.

In 3-dimensional ordered dither, a set of dither matrices is used in place of the one dither matrix of 2-dimensional ordered dither. With the set of dither matrices, an intensity of an element is compared to a cell of a matrix for a specific gray level. A gray level that is closest to the intensity of the element is first determined. A matrix, from the set of dither matrices, that corresponds to the gray level is selected. The cell of the selected matrix that corresponds to the element is selected. The cell either indicates that the pixel that corresponds to the element should be activated or off. The pixel is activated accordingly. This description of 3-dimensional ordered dither corresponds to the first description of 2-dimensional ordered dither above. There is currently no technique for generating a dither signal from the set of dither matrices of 3-dimensional ordered dither. Thus, there is no equivalent technique utilizing a summer and threshold analyzer for 3-dimensional ordered dither.

Both 2-dimensional and 3-dimensional ordered dither are pixel point processes. This means that each element of the continuous toned image signal is half-toned without any information regarding neighboring elements. The spatial arrangement and repetition of the dither matrix, or matrices in the case of 3-dimensional ordered dither, imply structure relative to neighboring elements. This structure is structure only in a statistically sense. There is, however, no guarantee of structure. This problem may be more easily seen with reference to FIGS. 2A and 2B. FIG. 2A shows a one dimensional dither matrix 16 applied to a first image signal 18. The first image signal 18 comprises of twelve continuous toned element intensities. The combination of the intensity and its position in the image make up the image. As can be seen, five of the elements of the first image have intensities above the thresholds of the corresponding cells of the dither matrix 16. The pixels that correspond to these five elements will be activated. The other elements have intensities below the thresholds of the corresponding cells, and their corresponding pixels will not be activated. FIG. 2B shows the one dimensional dither matrix 16 applied to a second image signal 20. The elements of the second image signal 20 have the same total intensity as the elements of the first image signal 18. That is, the sum of the heights of the twelve intensities is the same in the first image signal 18 as in the second image signal 20. In FIG. 2B, however, no pixels will be activated. Each intensity is below the threshold of the corresponding cell. There is no correspondence between the average value of the image signal and the average value of the output signal. Thus, the output is distorted. Ideally, since the total intensity is the same in both signals 18, 20, the outputs would have the same number of pixels activated. This will only happen, however, if the both image signals 18, 20 are uniform. This problem applies to both 2-dimensional ordered dither and 3-dimensional ordered dither.

Thus, there is a need for a system and method for the thresholds of a dither matrix to insure local correspondence between the average intensity of the input signal and the average intensity of the output signal for a local spatial area of the output image. There is a further need for a system to reduce distortions introduced to the output image by the output device and for a system to generate a dither signal from a set of dither matrices for 3-dimensional ordered dither.

SUMMARY OF THE PRESENT INVENTION

The present invention overcomes the limitations and deficiencies of the prior art with a system and method for insuring that the average intensity of the output image is near the average intensity of the input image within local spatial areas. The system has a first input, a second input, and an output. The system receives a reference image signal through the first input and receives a continuous toned image signal through the second input. The reference image signal may be the continuous toned image signal, a modified version of the continuous toned image signal, or another image signal. The system comprises an image adaptor, an image half-toner, and a pixel activator. The image adaptor receives the reference image and adapts the reference image to insure local correlation. The image adaptor divides the reference image signal into local areas and determines an average intensity of the elements within the local areas. The average intensities, rounded to the nearest integer, are the number of pixels, within the same local areas of the output image that are to be activated.

The image half-toner receives the continuous toned image signal. The image half-toner comprises a summer and a dither signal generator. The image adaptor outputs an adaptive signal which indicates the number of pixels in each local area to be activated. The dither signal generator generates a dither signal, and the summer adds the dither signal to the continuous toned input signal to produce a half-toned image signal. The summer adds each intensity to a dither signal for that element to produce a half-toned image signal of combined intensity and dither signal. The pixel activator receives the half-toned image signal and the adaptive signal. The pixel activator determines the elements in each local area having the highest combined intensity and dither signal. The pixel activator generates a signal to activate a number pixels, that correspond to the number of elements equal to as the adaptive signal. The pixels activated are those that correspond to elements having the highest combined intensity and dither signal. For example, if the adaptive signal for a local area is 3, then the pixels for the 3 elements having the highest combined intensity and dither signal within the local area are activated. The other pixels are not activated.

The present invention also includes a image compensator to correct the output image for distortions introduced by the output device. The image compensator receives the continuous toned image signal and modifies it with a signal of the inverse of the distortions introduced to the output image by the output device. The image compensator then provides its output signal to the image adaptor.

The present invention provides a system for increasing the details in an output image. The detail enhancer receives the continuous toned image signal and enhances the details. The detail enhancer then provides the continuous toned image signal, with enhanced details, to the summer.

Finally, the present invention includes a method for insuring that the average intensity of the output image is near the average intensity of the input image within local spatial areas. The method includes the steps of: determining the average intensity of elements over local areas, generating an adaptive signal that indicates the number of pixels in each local area that are to be activated, summing a dither signal with a continuous toned image signal, and generating a signal for each local area to activate the pixels for the number of elements in each local area that are to be activated where the elements have the highest combined dither signal and intensity in the local area.

The present invention also includes a method for generating a dither signal from a set of dither matrices for 3-dimensional ordered dither. The method includes the steps of determining the cell of the dither matrices that corresponds to a selected element, generating a signal of a constant if the cell indicates that a corresponding pixel is to be activated, and generating a signal of the inverse of the constant if the cell indicates that the corresponding pixel is not to be activated.

DETAILED DESCRIPTION OF THE PREFERRED EMBODIMENT

Figure 3:
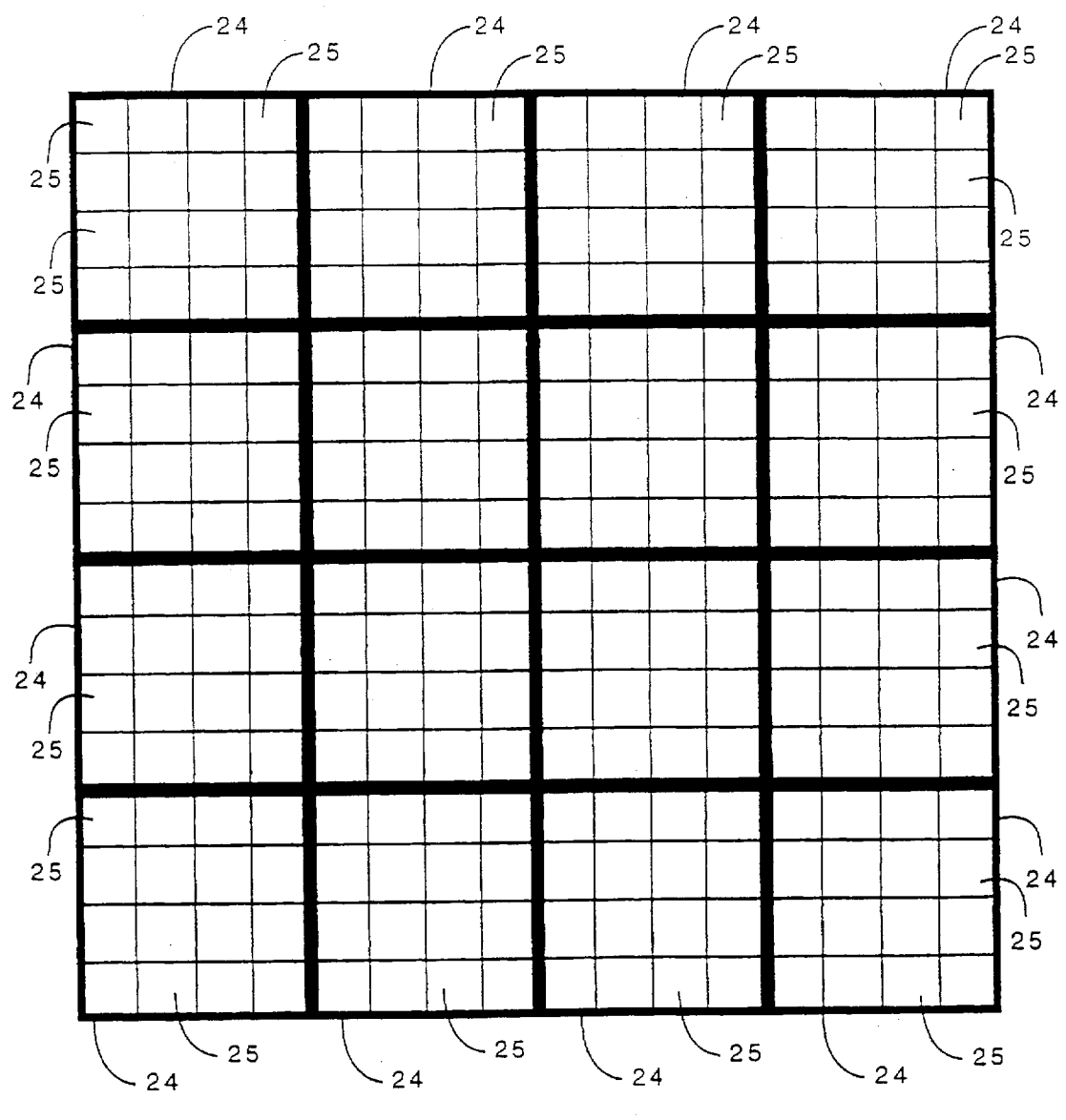
FIG. 3 is a block diagram of a dither matrix with local areas according to the present invention.

Referring now to FIG. 3, a block diagram of an exemplary dither matrix 22 is shown. The dither matrix 22 may be a matrix for 2-dimensional dither or may be one of a set of dither matrices for 3-dimensional dither. The dither matrix 22 is divided into 16 local areas 24. A local area 24 is located in the upper, right hand corner. The remaining 15 local areas 24 are arranged regularly across the dither matrix 22. Each local area 24 is preferably the same size and shape. Furthermore, if the dither matrix 22 is one of a set of dither matrices for 3-dimensional dither, all dither matrices of the set are divided into local areas identically to the division of the dither matrix 22. The dither matrix 22 is 16 cells 25 by 16 cells 25, and each local area 24 is 4 cells 25 by 4 cells 25. Dither matrices may be of any size. Local areas also may be of any size but are preferably much smaller than the dither matrix.

When the dither matrix 22 is replicated across the input image, the local areas 24 are also replicated. Thus, the input image is divided into local areas 24 4 elements by 4 elements. The present invention provides for correspondence between the average value of the input image signal and the output signal within the local areas. In this way, the present invention provides for structure within the output image that is actual and not merely statistical.

Figure 1:
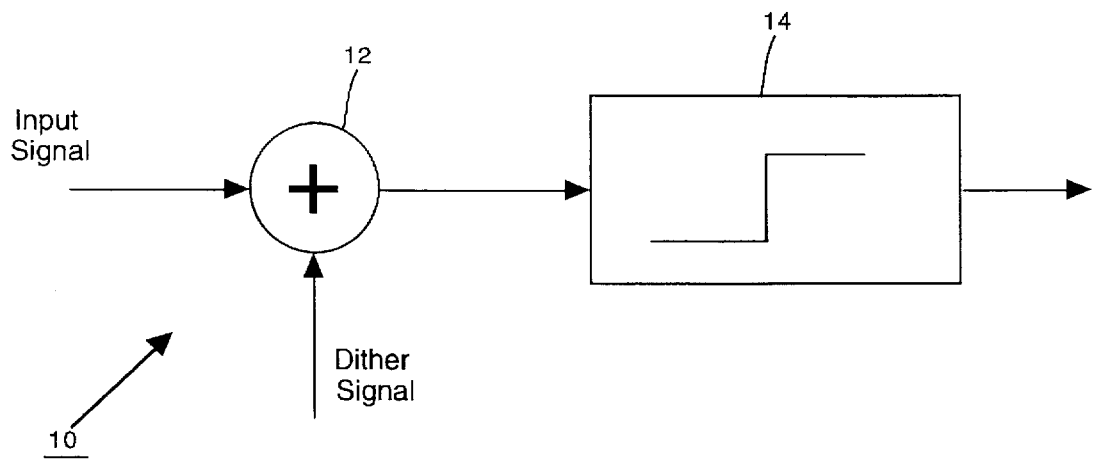
FIG. 1 is a block diagram of a prior art system for half-toning a continuous toned image signal by adding a dither signal to the continuous toned image signal.
Figure 2A:
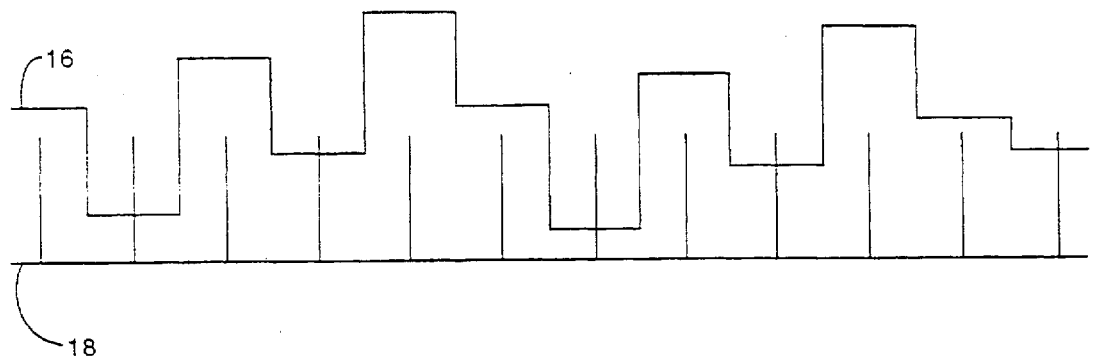
FIGS. 2A and 2B are graphical description of the introduction of distortion into an output image due to non-correlation of intensity between an input image and an output image.
Figure 2B:
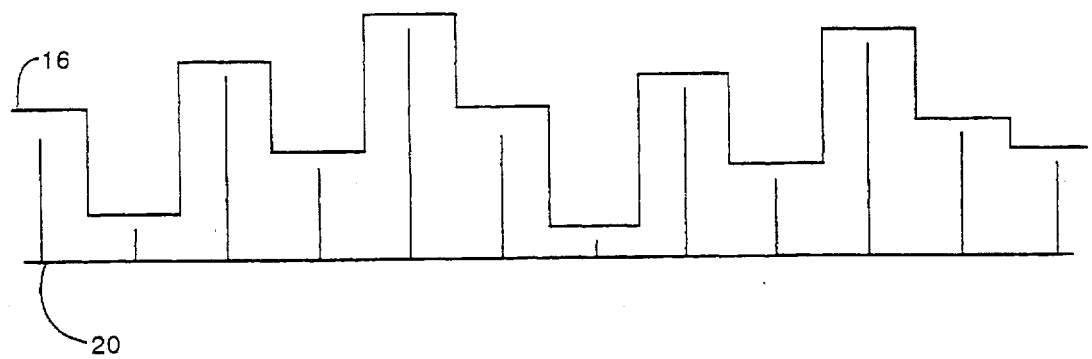
Figure 4:
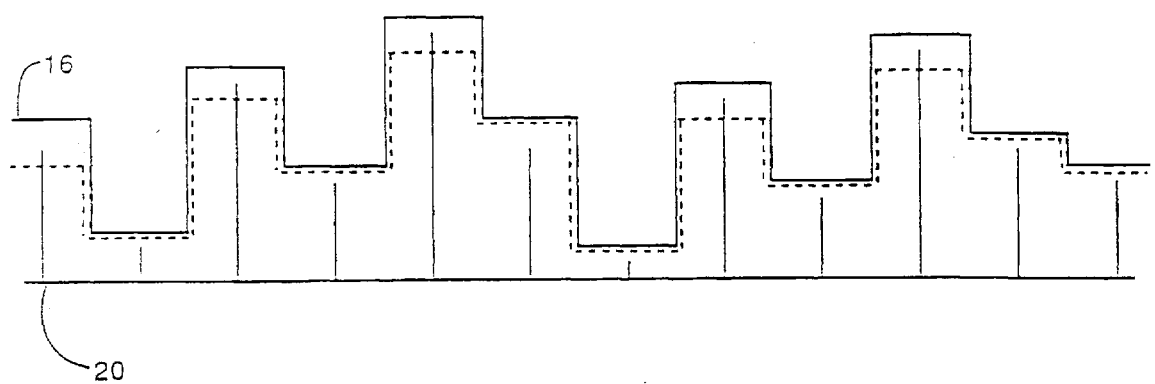
FIG. 4 is a graphical description of a dither matrix having thresholds adapted to increase local correlation between an input image and an output image.

Referring now to FIG. 4, a block diagram of the image signal 20 and dither matrix 16 is shown. FIG. 4 illustrates how the present invention provides correlation between the intensity of the input continuous toned image signal and that output, half-toned having representation signal. As shown in FIG. 2A, at least five pixels of the output image should be activated. The present invention determines the average intensity of the input signal over local areas and adapts the dither signal to insure that the output signal has the same intensity as the input signal. The present invention lowers the thresholds for the most intense elements within a local area so that correct number of pixels are activated. Thus, the present invention has lowered the thresholds of five cells of the dither matrix 16 so that four pixels are activated and the average intensity within the local area shown in FIG. 4, of the output image is the same as the average intensity, within the corresponding local area, of the input image.

Figure 5:
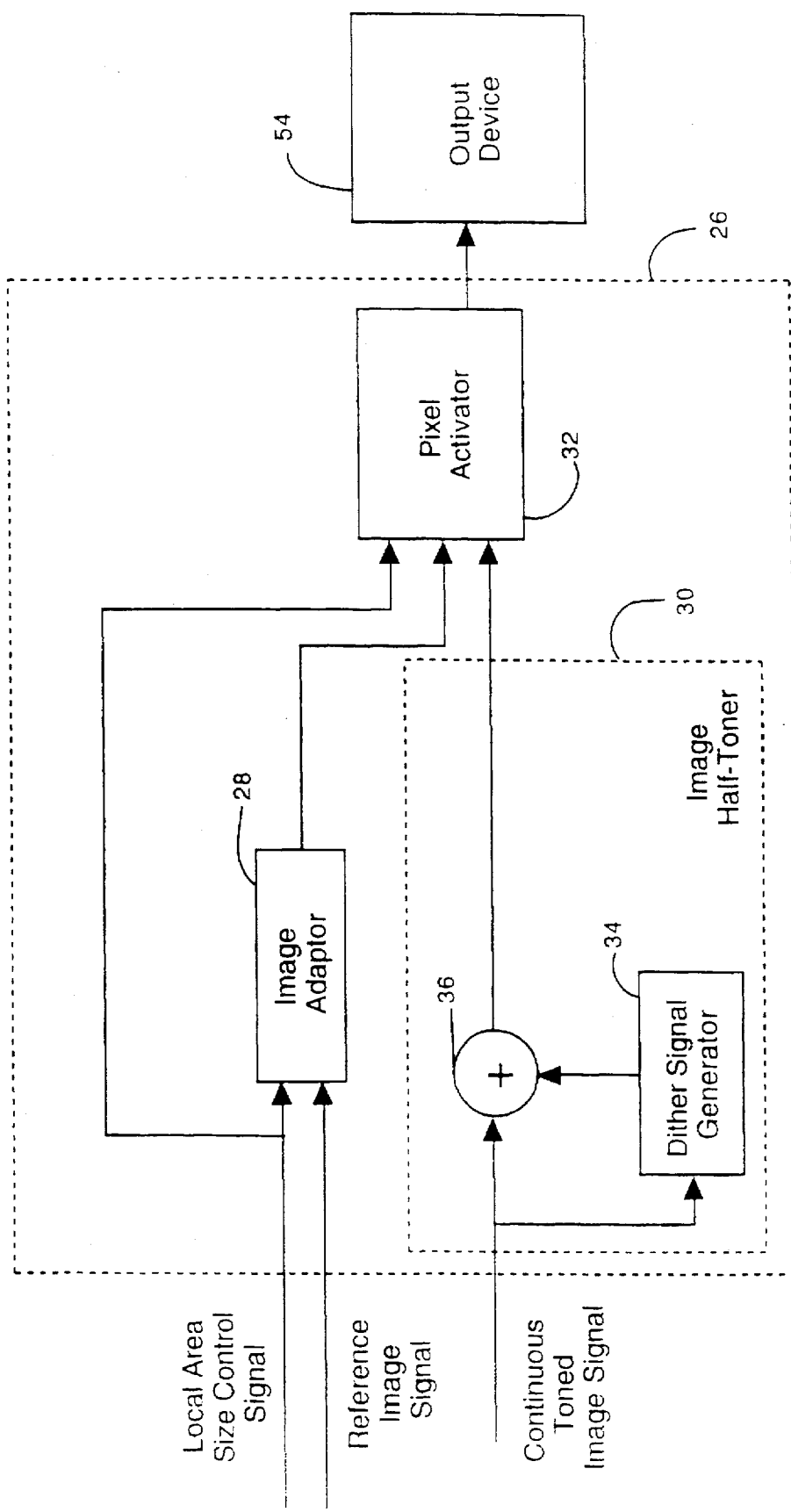
FIG. 5 is a block diagram of a system, constructed according to the present invention, for producing an output image with local correlation.

Referring now to FIG. 5, a quantizer 26 for generating a binary representation signal, which is suitable for outputting on an output device 54, from a continuous toned image signal, is shown. The binary representation signal is adapted to insure local correspondence between the average value of the input signal and the binary representation signal for local spatial areas. The quantizer 26 has a first input coupled to receive a reference image signal, a second input coupled to receive a continuous toned image signal, a third input coupled to receive a local area size control signal, and an output. The output of the quantizer 26 is coupled to the output device 54. The output device 54 is a printer, monitor, or other output device. As shown in FIG. 5, the reference image signal represents an image that is separate and independent from the continuous toned image. The reference image signal may, however, be the same as the continuous toned image signal or may be a modified version of the continuous toned image signal. The reference image signal preferably has the same size, shape, and number of elements as the continuous toned image signal. The quantizer 26 comprises an image adaptor 28, an image half-toner 30, and a pixel activator 32. The image adaptor 28 has a first input, which forms the first input of the quantizer 26, a second input, which forms the third input of the quantizer 26, and an output. The image adaptor 28 receives the reference image signal and generates an adaptive signal. The image adaptor 28 receives the reference image signal through the first input and receives a local area size control signal through the second input. The local area size control signal specifies the size and shape of the local areas 24 into which the image adaptor 28 will divide the reference image signal. In an alternate embodiment, the quantizer 26 defaults to a predetermined size for the local areas 24 and no local area size centered signal is received.

The adaptive signal is used to force the output binary representation signal to have an average intensity value near the average intensity value of the reference image signal for the local areas 24 of the continuous toned image signal. The image adaptor 28 divides the reference image signal into local areas 24, according to the local area size control signal. These local areas are the same size and shape as the local areas 24 of the dither matrix 22, or matrices. Note that the dither matrix 22, or matrices, are replicated across the continuous toned input image. Thus, if the dither matrix 22, or matrices, are divided into local areas 24 four cells 25 by four cells 25, then the reference image is divided into local areas that are four elements by four elements. There will be sixteen local areas for each replication of the dither matrix, or matrices, across the continuous toned input image.

Each element of the reference image has an intensity value. The image adaptor 28 determines the mean of the intensity values of the elements in each local area 24. The image adaptor 28 adds the intensities of each element in a local area and divides the sum by the number of elements in the local area 24 to determine the mean intensity for the local area 24. The image adaptor 28 then divides the resulting mean by the full range of values the intensities may have. For example, if the intensity may have values from 0 to 255, then the image adaptor 28 divides the means by 256. The image adaptor 28 then multiplies the result by the number of pixels in a local area 24. Those skilled in the art will realize that since in the preferred embodiment there are the same number of pixels as elements in corresponding local areas 24, the image adaptor 28 need only divide the sum of the intensities of each local area by the full range the intensities can have. The image adaptor 28 rounds the final result for each local area 24 to the nearest integer. The resulting value, Z, for a local area 24 is the number of pixels in the final output image, within the corresponding local area 24, that are to be activated. There is a Z value for each local area 24 of the reference image. The image adaptor 28 generates a signal of the Z values for the local areas 24 of the reference image. This signal is the adaptive signal. The image adaptor 28 outputs the adaptive signal through its output.

The image half-toner 30 has an input, which forms the second input of the quantizer 26, and an output. The image half-toner 30 receives the continuous toned image signal, generates a ditherized signal; and outputs the ditherized signal.

The image half-toner 30 comprises a dither signal generator 34 and a summer 36. The dither signal generator 34 generates a dither signal. The image summer 36 sums the dither signal with the intensity values of the continuous toned image signal to half-tone the continuous toned input image and outputs the ditherized signal. The dither signal generator 34 has a set of dither matrices for 3-dimensional dither. The dither signal generator 34 also has an input, and an output.

The dither signal generator 34 generates a dither signal. The dither generator 34 is synchronized with the summer 36 so that the summer 36 adds the appropriate value from the dither generator 34 to the corresponding intensity of the continuous toned image signal. Thus, the dither generator 34 automatically generates the appropriate dither signal for an element of the continuous toned image signal. Those skilled in the art will recognize how to synchronize the dither generator 34 and summer 36. In an alternate embodiment, the dither generator 34 and summer 36 generate signals between then to indicate the current element and appropriate dither signal for the current element. When using a set of dither matrices, then the dither signal generator 34 receives the continuous toned image signal and generates a signal of $+\beta$ or $-\beta$ for each element of the continuous toned image signal. $\beta$ is a constant; any constant may be used. Those skilled in the art will recognize how to select $\beta$. The value of $\beta$ may be adjusted to enhance or modify otherwise the final output image that appears on the output device 54. The dither signal generator 34 generates a signal of $+\beta$ if a dither matrix, of the set of dither signal matrices indicates that a pixel should be activated and generates a signal of $-\beta$ if a dither matrix indicates that a pixel should not be activated. The method by which the dither signal generator 34 generates a dither signal from a set of dither matrices will be discussed below in connection with FIG. 7.

In an alternate embodiment, the dither signal generator 34 has a single dither matrix for 2-dimensional dither. The dither signal generator 34 provides the thresholds held in the cells of the single dither matrix to the summer 36. In this alternate embodiment, the dither signal generator 34 does not have an input coupled to receive the continuous toned image signal.

The summer 36 has a first input coupled to receive the continuous toned image signal and a second input coupled to receive the dither signal from the dither signal generator 34. The summer 36 also has an output, which forms the output of the quantizer 30. The summer 36 adds the dither signal to the continuous toned image signal on an element by element basis. The summer 36 adds the intensity value of each element to the appropriate dither signal for that element. The summer 36 then outputs the resulting sum as the ditherized signal.

The pixel activator 32 has a first input coupled to receive the adaptive signal from the image adaptor 28, a second input coupled to receive the ditherized signal from the image half-toner 30, and a third input coupled to receive the local area size control signal. The pixel activator 32 has an output that forms the output of the quantizer 26. The adaptive signal provides a Z number for each local area. The elements of the ditherized signal within a local area are referred to as a local area group. The pixel activator 32 matches each local area group with its Z number. The adaptive signal includes an identifier that matches each Z number with its local area. Furthermore, the pixel activator 32 receives the local area size control signal through its third input. Thus, the pixel activator 32 determines the size, shape, and corresponding Z number for each local area. The pixel activator 32 then determines the Z number of modified elements within the local area group having the highest element values, where the element value is the combination of the intensity value and the dither signal. The pixel activator 32 generates a signal, for each local area, to activate the pixels that correspond to the Z modified elements with the highest element values for each local area. For example, if a first local area has a Z number of 4 and a second local area has a Z number of 6, then the pixel activator 32 will generate a signal to activate the pixels that correspond to the 4 elements of the first local area that have the highest element values. Similarly, the pixel activator 32 will generate a signal to activate the 6 pixels that correspond to the 6 elements, in the second local area, that have the highest element values. The pixel activator 32 also generates a signal not to activate the other pixels. These signals make up the binary representation signal.

Figure 6:
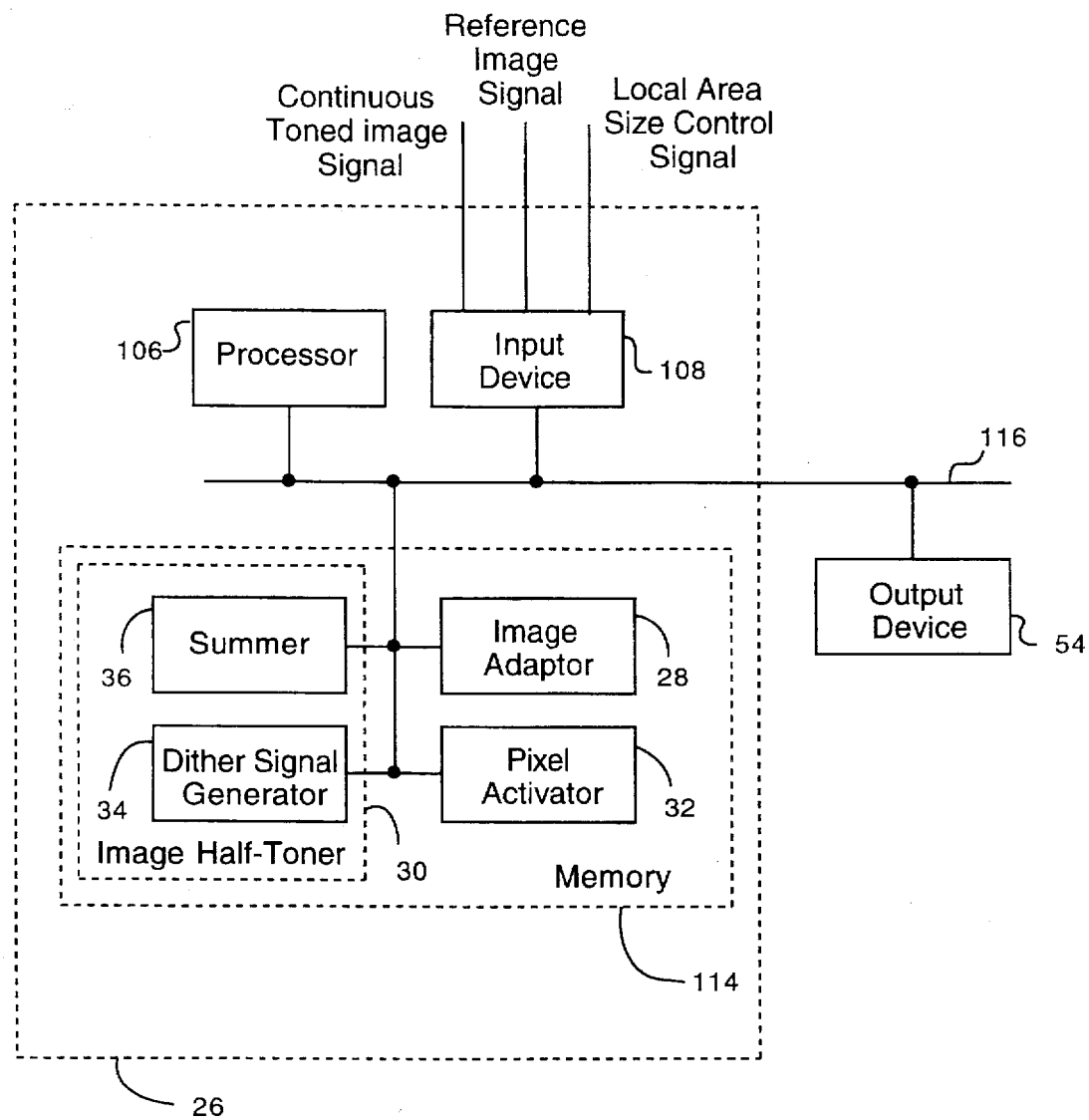
FIG. 6 is a block diagram of the preferred embodiment of a system for producing an output image with local correlation.

Referring now to FIG. 6, a block diagram of the preferred embodiment of the quantizer 26 for generating a binary representation signal of a continuous toned image signal is shown. The quantizer 26 comprises a processor 106, an input device 108, and memory 114. The processor 106, input device 108, and memory 114 are coupled in a von Neumann architecture by a bus 116. The processor 106 is preferably a microprocessor such as a Motorola 68040. The input device 108 preferably includes a keyboard and mouse type controller. The input device 108 preferably also includes a conventional image capture device for receiving a continuous toned image signal and the reference image signal. In an exemplary embodiment the quantizer 26 is a Macintosh Quadra 840AV computer system from Apple Computer, Inc. of Cupertino, Calif. Those skilled in the art will realize that he quantizer 26 could also be implemented on an IBM personal computer or any other computer system.

The memory 114 is constructed with random access memory and read only memory. The memory 114 stores data and program instruction steps for execution by the processor 106. While the memory 114 will now be described as including separate devices, those skilled in the art will realize that the components of the memory 114 may occupy contiguous portions of the same memory device.

The memory 114 comprises the summer 36, dither signal generator 34, image adaptor 28, and pixel activator 32. The summer 36 has an input coupled to the bus 116 for receiving the continuous toned image signal from the input device 106. The summer 36 has an output coupled to the bus 116 for asserting the ditherized signal. The dither signal generator 34 similarly has an input coupled to the bus 116 for receiving the continuous toned image signal and an output coupled to the bus 116 for transmitting the dither signal to the summer 36. The image adaptor 28 has a first input and a second input coupled to the bus 116 for receiving the reference image signal and the local area size control signal respectively. The image adaptor 28 has an output coupled to the bus 116 for transmitting the adaptive signal. Finally, the pixel activator 32 has a first input, a second input, and a third input coupled to the bus 116. The pixel activator 32 receives the adaptive signal through the first input, the ditherized signal through the second input, and the local area size control signal through the third input. The pixel activator 32 is also has an output coupled to the output device 54 by the bus 116.

The summer 36, dither signal generator 34, image adaptor 28, and pixel activator 32 include program instruction steps for execution by the processor 106. The dither signal generator 34 includes a set dither matrices for 3-dimensional dither. In an alternate embodiment, the dither signal generator 34 includes a single dither matrix for 2-dimensional dither. The functionality of the summer 36, dither signal generator 34, image adaptor 28 and pixel activator 32 is the same as described above with reference to FIG. 5.

Figure 7A:
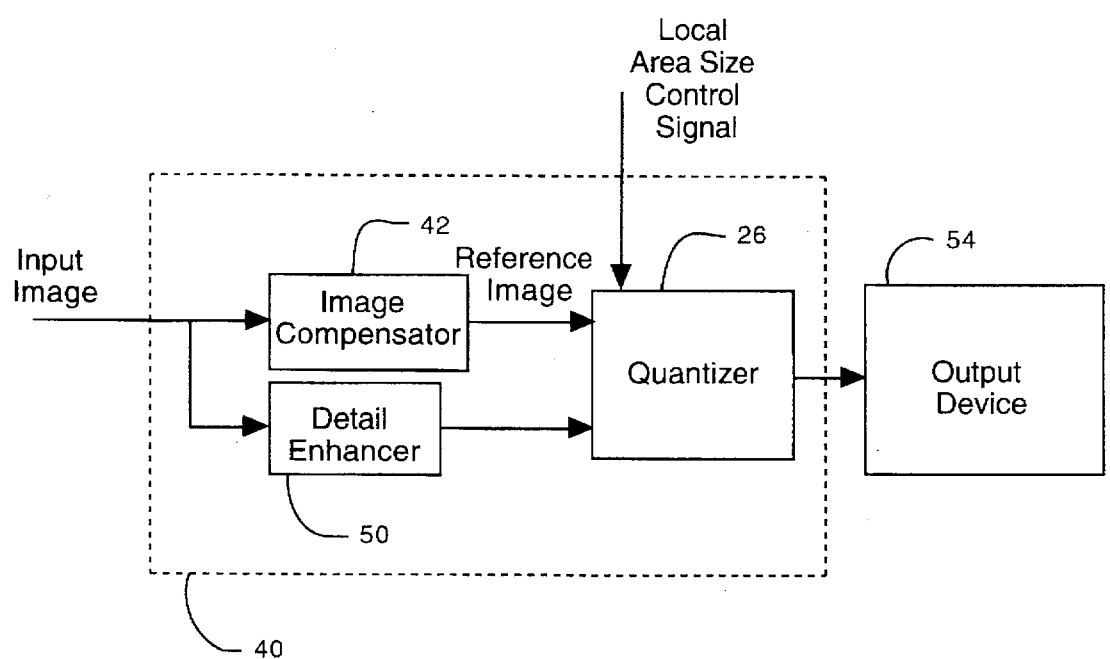
FIG. 7A is a block diagram of a system for enhancing details in an output image and for compensating for distortion introduced into the output image constructed according to the present invention.

Referring now to FIG. 7A, a block diagram of a system 40 for reducing the distortions introduced into an output image by the output device 54 and for enhancing details of an output image is shown. The system 40 comprises an image compensator 42 and the quantizer 26. The present invention not only overcomes the problem of non-correspondence between the intensity of the input image and the output image, but the present invention also provides a system for compensating for distortions introduced by the output device 54 or by other sources of distortions. Furthermore, often when a continuous toned image signal is transformed into a binary representation signal, details of the image are lost or obscured. The system 40 corrects this deficiency with the detail enhancer 50. The system 40 receives a continuous toned image signal and the local area size control signal and outputs a binary representation signal that has been modified to compensate for distortions that the output device 54 introduces and has enhanced lines and other details.

The image compensator 42 has an input, through which it receives the continuous toned image signal, and an output. The image compensator 42 modifies the continuous toned image signal with the inverse of the characterization of the distortion that the output device 54 will introduce. The image compensator 42 then generates and outputs a signal of the modified continuous toned image signal and outputs the signal throughout its output.

Note that the image compensator 42 may compensate for various types distortion. It is not limited to correcting for distortions introduce by the output device 54.

The detail enhancer 50 has an input, coupled to receive the continuous toned image signal. The detail enhancer 50 determines lines and other details in the continuous toned input image, and modifies the continuous toned image signal to enhance the lines and other details. The detail enhancer 50 then generates a signal of the modified continuous toned image signal and outputs the signal through its output.

The quantizer 26 has a first input coupled to receive the modified continuous toned image signal from the image compensator 42, a second input coupled to receive the continuous toned image signal with enhanced details from the detail enhancer 50. The quantizer 26 has a third input for receiving the local area size control signal. The quantizer 26 was discussed above in connection with FIG. 5. The quantizer 26, however, may be any two input quantizer for transforming a continuous toned image signal into a binary representation signal suitable for outputting on an output device such as a printer or monitor. Finally the quantizer 26 has an output coupled to the output device 54.

The continuous toned image signal, modified by the image compensator 42, is input to the quantizer 26 as the reference image signal. By applying the inverse of the distortion to the reference image, the present invention reduces the final distortions in the final output image. The quantizer 26 receives the reference image signal and applies the reference image signal to the continuous toned image signal to produce a binary representation signal that will produce an output intensity that corresponds to the intensity of the image. The quantizer 26 simultaneously introduces the inverse of the output device 54 distortion to the output binary representation signal. The quantizer 26 introduces the inverse distortion through the adaptive signal. When the output device 54 receives the binary representation signal and introduces its distortions, the distortions of the output device 54 will cancel the inverse distortions and the final output will be undistorted.

Ordered dither may degrade or destroy the perceived edge rendition of the continuous toned image signal. The detail enhancer 50 analyzes the continuous toned image signal and re-enforces the edges of the image. Then, when the edges are degraded by the application of the dither signal, the edges are only degraded back to their original position.

Figure 7B:
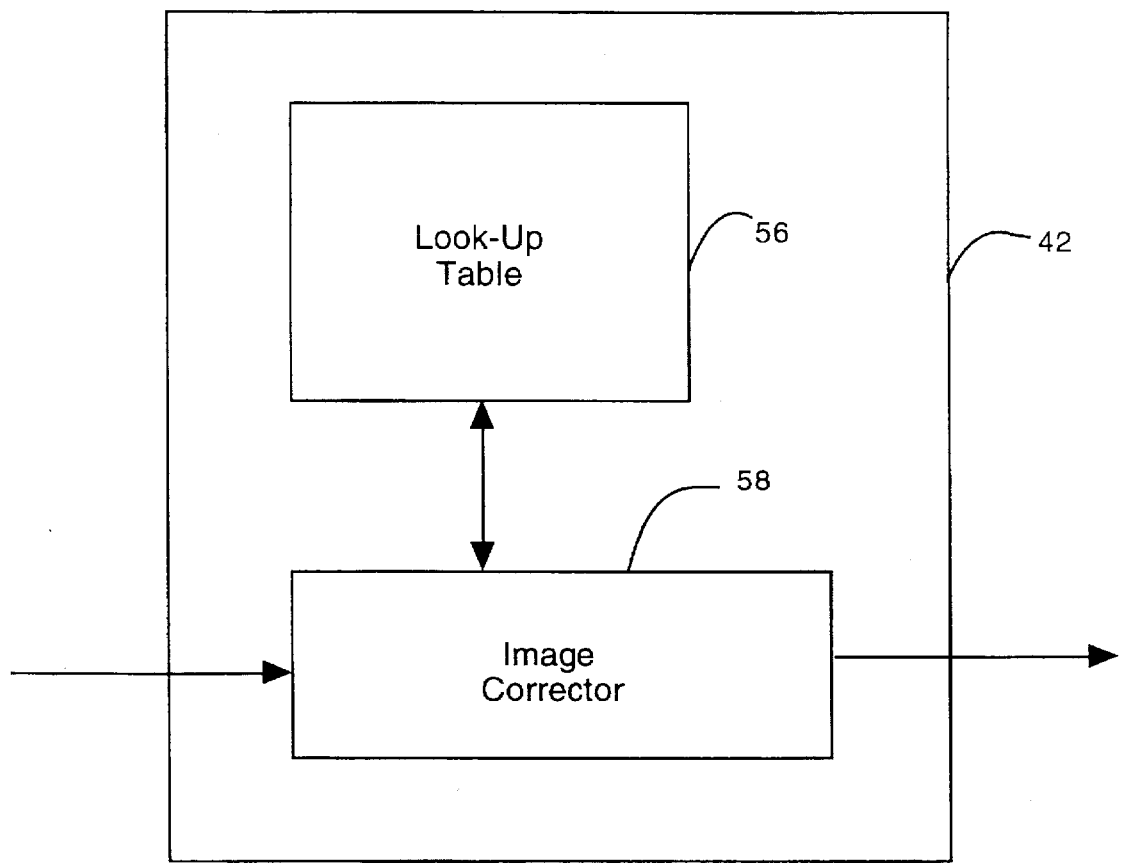
FIG. 7B is a block diagram of an exemplary image compensator.

Referring now to FIG. 7B, a block diagram of the image compensator 42 is shown. The image compensator 42 comprises an image corrector 58 and a look-up table 56. The image corrector 58 has a first input, which forms an input of the image compensator 42, and a first output, which forms an output of the image compensator 42. The image corrector 58 has a second input and a second output which are coupled to the look-up table 56. The image corrector 58 receives the continuous toned image signal, applies the inverse of the distortion that the output device 54 will introduce, and outputs a modified continuous toned image signal. The look-up table 56 has an input and an output which are coupled to the image corrector 58. The look-up table 56 holds a signal representative of the inverse distortion of the output device 54. The inverse distortion is a function of the intensity of an element. Thus, for each possible intensity that an element may have, the look-up table 56 holds a signal of that value the intensity must have in order to appear on the output device 54 undistorted. When the look-up table 56 receives an intensity from the image corrector 58, the look-up table 56 determines the appropriate compensated intensity and generates a signal indicative of the compensated intensity.

The image corrector 58 modifies each element of the continuous toned image signal. The image corrector 58 receives the continuous toned image signal. The image corrector 58 then determines the intensity of the element and generates a signal of the intensity to the look-up table 56. When the image corrector 58 receives the inverse distortion signal from the look-up table 58, the image corrector 58 replaces the intensity of the element within compensated intensity. The image corrector 58 replaces each intensity of the continuous toned image signal with its corresponding compensated intensity. Thus, the image compensator 42 generates a reference image signal that is compensated for distortion introduced by the output device 54.

Figure 8:
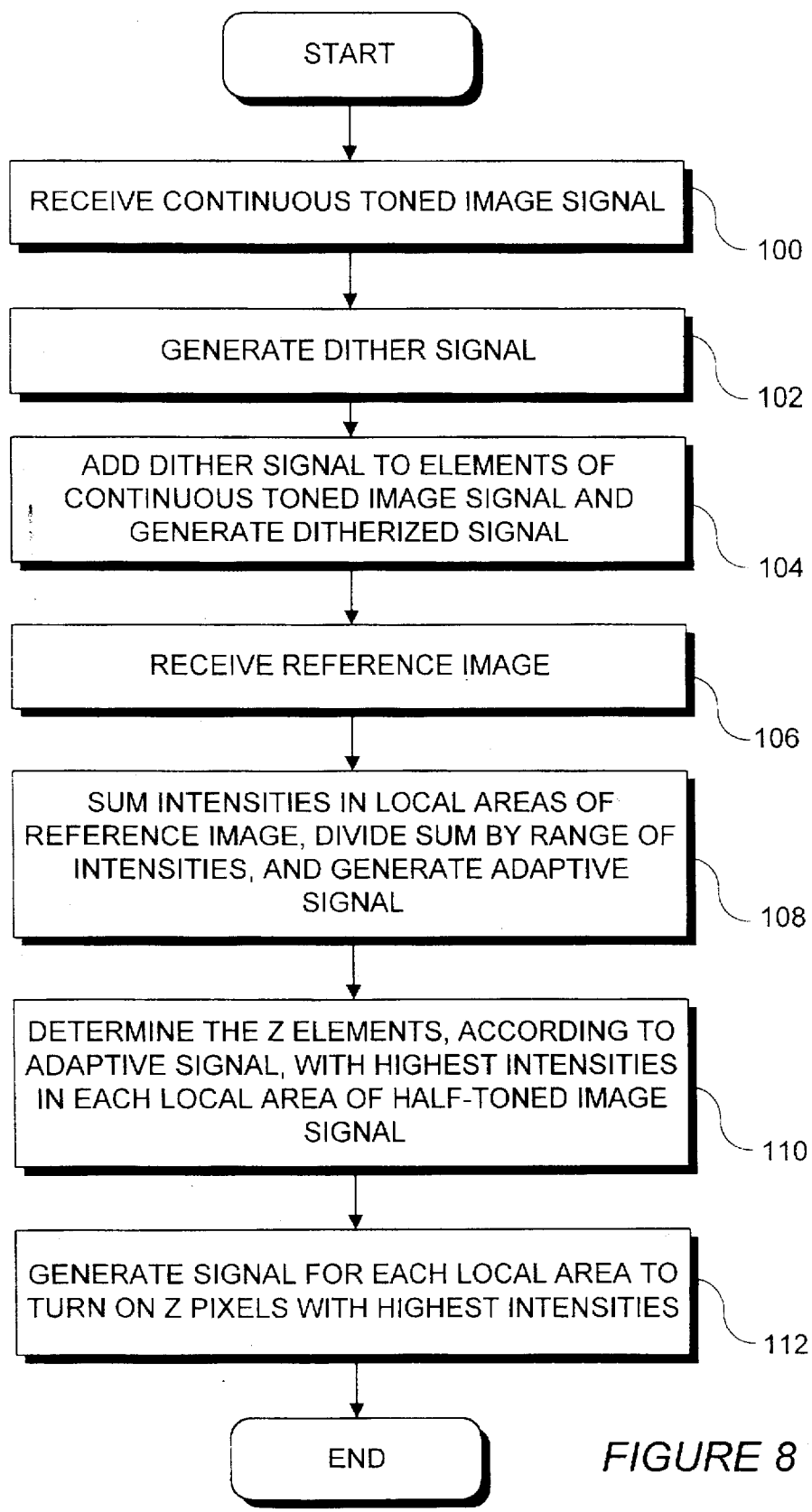
FIG. 8 is a flow chart of a method for insuring local correlation between the intensity of an input image and an output image.

Referring now to FIG. 8, a flow chart of a preferred method for generating a binary representation signal that is adapted to insure local correspondence between the average value of the intensity of a continuous toned image signal and the binary representation signal is shown. The method begins in step 100 where a continuous toned image signal is received. In step 102, a dither signal is generated. The dither signal may be generated either from a single dither matrix for 2-dimensional, ordered dither or from a set of dither matrices for 3-dimensional, ordered dither. If a single dither matrix is used, the dither signal is the value stored in each cell of the dither matrix. A method for generating a dither signal from a set of dither matrices will be described below in connection with FIG. 9.

Next, in step 104, the received continuous toned image signal is added to the dither signal and a ditherized signal is generated. The continuous toned image includes a plurality of elements. The intensity value of each element is added to the value of its corresponding cell of the dither matrix in step 104.

A reference image signal is received in step 106. The reference image signal may be the continuous toned image signal, may be a modified version of the continuous toned image signal, or may be another reference image signal. The reference image signal has a plurality of elements, each element corresponding to an element of the continuous toned image. Preferably, the reference image is the same size and shape and has the same number of elements as the continuous toned image. The reference image is divided into local areas in step 108, and the sum of the intensities of the elements of the reference image, within each local area, is determined. In step 108, a mean is determined for the intensities in each local area by dividing each sum by the number of elements in each local area. For example if the sum of the intensities for a local area is 480, and local areas have 16 elements, then the average for this local area is 30. The average intensity is then divided by the full range that the intensities may have, and the result is multiplied by the number of pixels in a local area. Continuing the above example, if the full range of intensities is 0–99 then 30 is divided by 100 and then multiplied by 16. Those skilled in the art will realize, in light of the preferred embodiment where there is the same number of pixels as elements in corresponding local area, the method need only divide the sum of the intensities by the full range of intensities to determine this result. The final result, rounded to the nearest integer, is the local area's Z number. In this example the Z number is 5. Those skilled in the art will realize that the Z number represents an average intensity for its local area, normalized for the number of pixels in a local area. The Z number is the number of pixels in the corresponding local area of the output image that should be activated to enforce correlation between the average intensity of the input image and the average intensity of the output image in the local areas. Finally, in step 108 an adaptive signal is generated. The adaptive signal includes the Z number for the local areas. With an identifier signal to match each Z number with its local area. Those skilled in the art will realize that steps 100, 102, and 104, may be performed in parallel with steps 106 and 108.

In step 110, the ditherized signal is divided into local areas as the reference image signal was divided, and each Z number is matched with its corresponding local area of the ditherized signal. Also in step 110, the elements of each local area having the Z highest combined intensity and dither signal values are identified. For example, if a local area has a Z number equal to 5, then the 5 elements in the local area having the highest combined intensity and dither signal are identified.

Finally, in step 112, a signal is generated to activate the pixels, which correspond to the elements identified in step 110, is generated. Continuing the example from above, a signal is generated to activate the 5 pixels that correspond the 5 elements of the ditherized signal. The signal generated in step 112 is the binary representation image signal, and the method ends.

Figure 9:
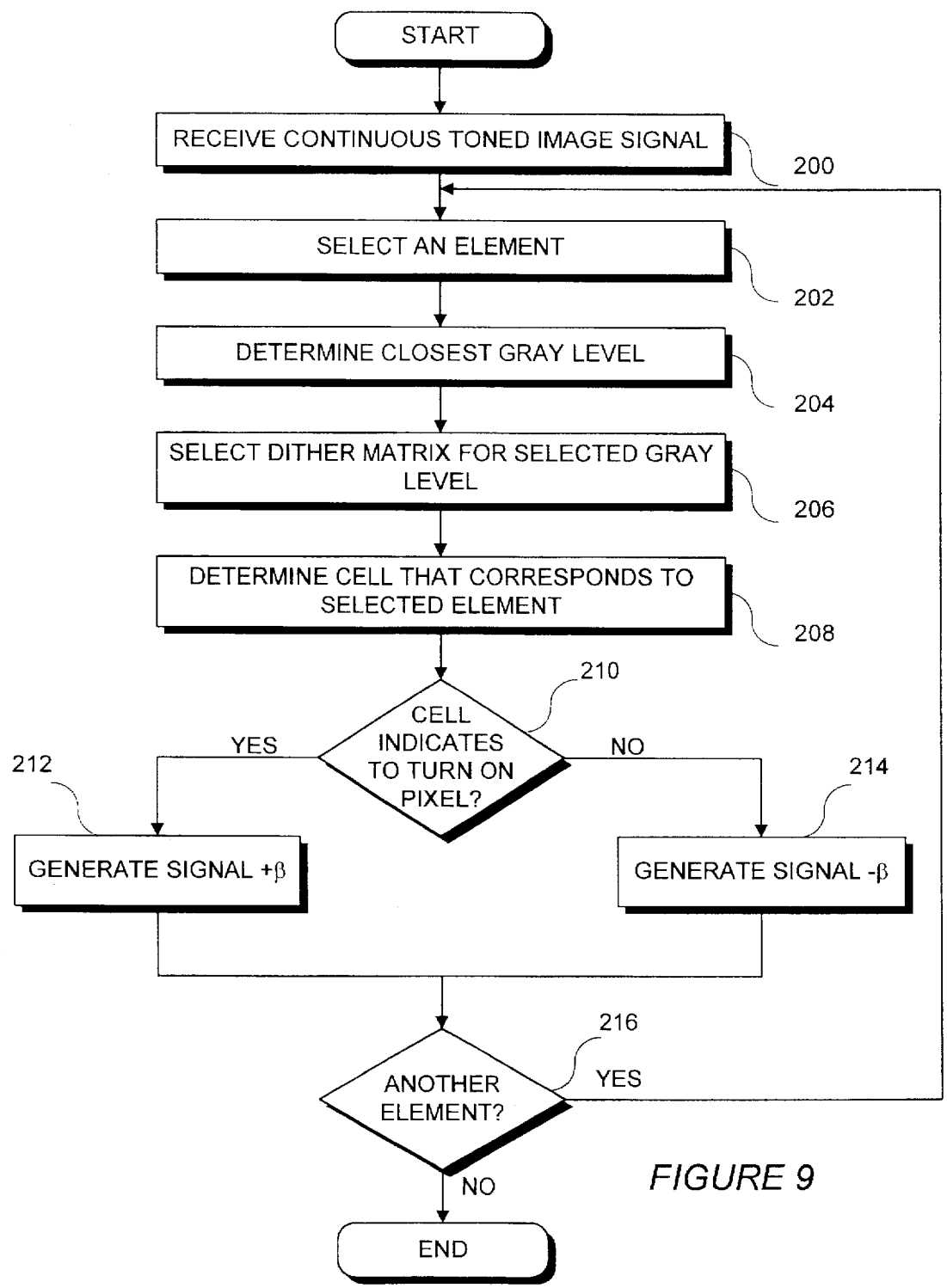
FIG. 9 is a flow chart of a method for generating a dither signal from a set of dither matrices for 3-dimensional dither.
Figure 10A:
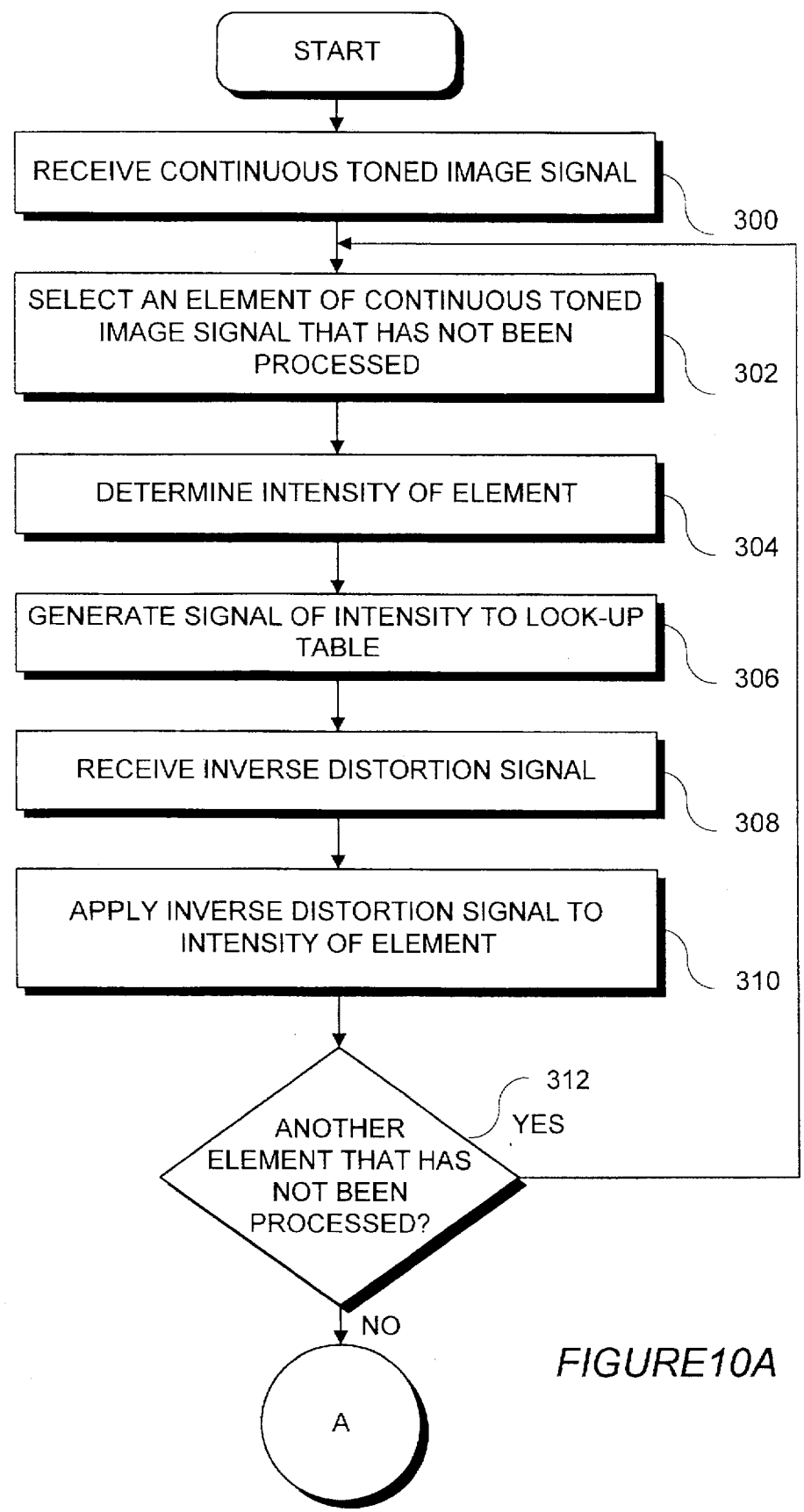
FIGS. 10A and 10B are flow charts of a method for modifying a continuous toned image signal to generate a reference image signal.
Figure 10B:
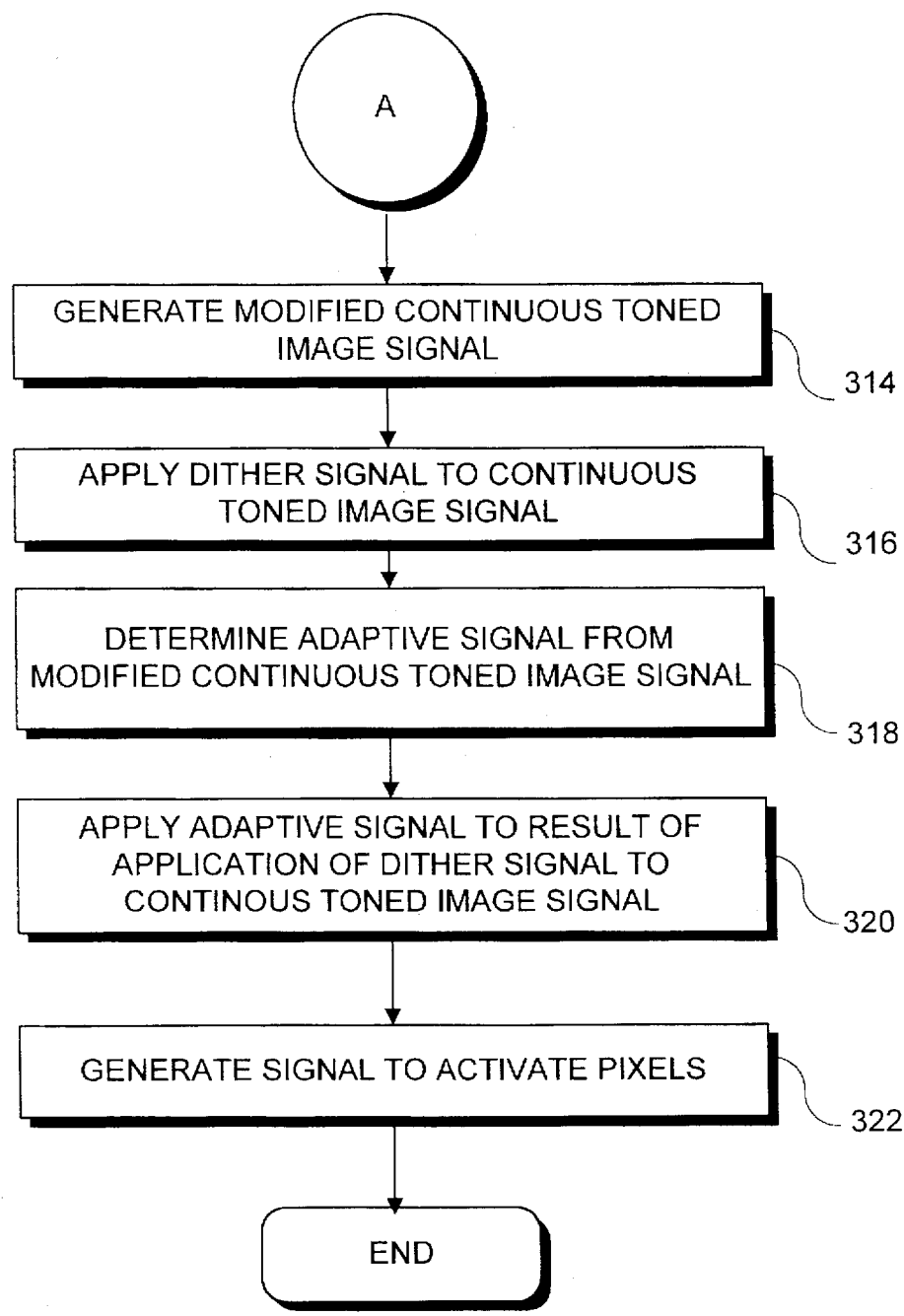

Referring now to FIG. 9, a flow chart of a method for generating a dither signal from a set of dither matrices for 3-dimensional dither is shown. The dither signal generator 34 generates the dither signal from a set of dither matrices it holds. The method begins in step 200 where a continuous toned image signal is received. In step 202, an unprocessed element of the continuous toned image signal is selected. Next in step 204, the gray level closest to the intensity level of the selected element is determined. For example, if there are 9 gray levels, 9 dither matrices, the intensities can take on values between 0 and 100, inclusive, and the intensity of an element is 35, then gray level 4, which corresponds directly with intensity 37.5, is selected as the closest gray level for the element having intensity of 35. The dither matrix for the selected gray level is selected in step 206. Continuing the above example, the dither matrix for gray level 4 is then selected from the set of dither matrices.

In step 208, the cell, of the selected dither matrix, that corresponds to the selected element is determined. In step 210, it is determined if the cell indicates that the corresponding pixel should be activated or if it indicates that the corresponding pixel should be turned off. The entries of the cells are digital. If the corresponding pixel should be activated, a signal held by the cell is set. If the pixel should not be activated, the signal is not set. If the cell indicates that the corresponding pixel should be activated, the method continues in step 212 where a signal of $+\beta$ is generated and output. If the cell indicates that the corresponding pixel should be turned off, the method continues in step 214 where a signal of $-\beta$ is generated and output. The signal generated in step 212 or in step 214 is the dither signal. This signal is output to a summer which adds the dither signal to the intensity value of the selected element.

In step 216, it is determined if there is another element that has not yet been processed. If there is another element, the method returns to step 202 to process another element. If there is not another element, the method ends. Thus, the method generates a dither signal from a set of dither matrices for 3-dimensional dither.

Referring now to FIGS. 8A and 8B, flow charts of a method for compensating a binary representation signal for distortions introduced by the output device 54 is shown. The method begins in step 300 where the image compensator 42 receives a continuous toned image signal. In step 302, the image corrector 58 of the image compensator 42 selects an element of the continuous toned image signal that is has not yet processed. In step 304, the image corrector 58 determines the intensity of the selected element and in step 306, generates a signal representing the intensity and sends it to the look-up table 56. The image corrector 58 receives a signal of the inverse distortion for the intensity from the look-up table 56 in step 308. The image corrector 58 receives back from the look-up table 56 a signal indicating the intensity that, when output on the output on the output device 54, appears as the original intensity was to appear. Thus, the element becomes the result of not only the intensity but also the inverse distortion. In step 312, the image corrector 58 determines if there is another element of the continuous toned image signal that has not yet been processed. If there is another element, the method returns to step 302 where another element is processed.

Once all the elements have been processed, the method continuous in step 314 where the image corrector 58 generates and outputs a modified continuous toned image signal. The quantizer 26 receives the modified continuous toned image signal as a reference image signal, and the quantizer 26 also receives the continuous toned signal. In step 316, the quantizer 26 adds a dither signal to the continuous toned image signal to generate a ditherized signal, and, in step 318, the quantizer 26 generates an adaptive signal from the reference signal. In step 320, the quantizer 26 applies, as explained above, the adaptive signal to the ditherized signal. The quantizer 26 then, in step 322, generates and outputs a signal that identifies the pixels to be activated on the output device 54. The method then ends.

While the present invention has been described with reference to certain preferred embodiments, those skilled in the art will recognize that various modifications may be provided. It is not required that the reference image signal be the same as the continuous toned image signal. Further, the reference image signal need not be a modified continuous toned image signal. The reference image signal may be any image signal. These and other variations upon and modifications to the preferred embodiments are provided for by the present invention, which is limited only by the following claims.

What is claimed is:

1. A system for generating a binary image signal for an output device, the system comprising:

an image compensator, having a first input coupled to receive a continuous toned image signal and an output, for generating a reference image signal;

an image adaptor, having an input coupled to the output of the image compensator to receive the reference image signal and an output, for determining an average intensity in a local area of the reference image signal and for generating an adaptive signal;

an image half-toner, having an input coupled to receive the continuous toned image signal and an output, for transforming the continuous toned image signal into a half-toned binary image signal; and a pixel activator, having a first input coupled to receive the adaptive signal from the image adaptor, and a second input coupled to receive the binary image signal from the image half-toner, for generating a pixel activation signal identifying to the output device the pixels that are to be activated.

2. The system of claim 1, wherein, the image compensator comprises:

a storage device, having inputs and outputs, for storing a plurality of signals representing an inverse of distortions introduced into a final output image; and an image corrector, having an input and an output coupled to the storage device and having an input coupled to receive the continuous toned image signal, for receiving inverse distortion signal and for modifying the continuous toned image signal in response to the inverse distortion signals to produce a reference image signal.

3. The system of claim 2, wherein the storage device is a look-up table storing signals representing an inverse distortion for a plurality of intensities.

4. The system of claim 1, further comprising a detail enhancer, having an input coupled to receive the continuous toned image signal and having an output coupled to the second input of the quantizer, for enhancing the details of the continuous toned image signal before the continuous toned image signal is converted into a binary image signal.

5. A quantizer for generating a binary image signal from a continuous toned image signal, the quantizer comprising:

an image adaptor, having an input coupled to receive a reference image signal and an output, for determining an average intensity in a local area of the reference image signal and for generating an adaptive signal;

an image half-toner, having an input coupled to receive the continuous toned image signal and an output, for transforming the continuous toned image signal into a half-toned binary image signal; and a pixel activator, having a first input coupled to receive the adaptive signal from the image adaptor, and a second input coupled to receive the binary image signal from the image half-toner, for generating a pixel activation signal identifying to an output device the pixels that are to be activated.

6. The system of claim 5, wherein the pixel activator generates the pixel activation signal in response to the adaptive signal.

7. The system of claim 6, wherein there is correlation between the intensity of the continuous toned image signal and the binary representation signal in a local area.

8. The system of claim 5, wherein the image half-toner comprises:

a dither signal generator, having an output, for generating a dither signal; and a summer, having a first input coupled to receive the continuous toned image signal, a second input coupled to receive the dither signal, and an output, for adding the dither signal to the continuous toned image signal.

9. The system of claim 8, wherein the dither signal generator includes at least one dither matrix.

10. The system of claim 9, wherein the dither signal generator generates the dither signal in response to more than one dither matrix.

11. The system of claim 10, wherein the dither signal generator has an input coupled to receive the continuous toned image signal.

12. The system of claim 9, wherein the dither matrix is divided into local areas.

13. A method for generating a binary image signal for an output device, the method comprising the steps of:

receiving a continuous toned image signal;

receiving a reference image signal;

half-toning the continuous toned image signal to produce a half-toned image signal;

generating an adaptive signal from the reference signal where the adaptive signal indicates a number of pixels to activate in a local area of the reference image signal; and modifying the half-toned image signal using the adaptive signal to generate the binary image signal.

14. The method of claim 13, wherein the step of generating comprises the steps of:

dividing the reference image signal into local areas;

determining a mean intensity for elements in each local area; and determining a number of pixels to activate for each local area; where the adaptive signal indicates the number of pixels to activate in each local area.

15. The method of claim 13, further comprising the step of processing the continuous toned image signal to compensate for distortions introduced in the output image by the output device and to generate the reference image signal.

16. The method of claim 13, further comprising the step of processing the continuous toned image signal to enhance details.

17. A system for generating a binary image signal for an output device, the system comprising:

means for receiving a continuous toned image signal;

means for receiving a reference image signal;

means for half-toning the continuous toned image signal to produce a half-toned image signal;

means for generating an adaptive signal from the reference signal where the adaptive signal indicates a number of pixels to activate in a local area of the reference image signal; and means for adapting the half-toned image signal according to the adaptive signal to generate the binary image signal.

18. The system of claim 17, wherein the generating means comprises:

means for dividing the reference image signal into local areas;

means for determining a mean intensity for elements in each local area; and means for determining a number of pixels to activate for each local area.

19. The system of claim 17, further comprising means for processing the continuous toned image signal to compensate for distortions introduced in the output image by the output device and to generate the reference image signal.

20. The system of claim 17, further comprising means for processing the continuous toned image signal to enhance details.

* * * * *